United States Patent [19]

Percival et al.

[11] Patent Number: 4,693,435
[45] Date of Patent: Sep. 15, 1987

[54] HIGH SPEED AIRCRAFT CONTROL SURFACE

[75] Inventors: William A. Percival, Granby; Leon Stoltze, Eart Harland, both of Conn.

[73] Assignee: United Technologies Corporation, Hartford, Conn.

[21] Appl. No.: 773,100

[22] Filed: Sep. 5, 1985

Related U.S. Application Data

[63] Continuation of Ser. No. 648,617, Sep. 10, 1984, abandoned, which is a continuation of Ser. No. 482,386, Apr. 6, 1983, abandoned, which is a continuation of Ser. No. 219,754, Dec. 23, 1980, abandoned.

[51] Int. Cl.$^4$ .......................... B64C 3/28; B64C 3/36
[52] U.S. Cl. ........................ 244/91; 244/3.24; 244/121; 244/124; 244/131; 416/224
[58] Field of Search ............... 244/117 A, 91, 123, 244/133, 158 A, 131, 224, 229, 124, 121, 324; 416/224, 229

[56] References Cited

U.S. PATENT DOCUMENTS

| | | | |
|---|---|---|---|
| 1,674,674 | 6/1928 | Wooster | 416/224 |
| 2,734,586 | 2/1956 | Wright et al. | 244/123 |
| 3,028,128 | 4/1962 | Friedrich | 244/124 |
| 3,114,319 | 12/1963 | Smith | 102/105 |
| 3,114,524 | 12/1963 | Conn, Jr. et al. | 244/124 |
| 3,145,000 | 8/1964 | Mackie | 244/123 |
| 3,174,711 | 3/1965 | Sullivan | 244/123 |
| 3,430,898 | 3/1969 | Parechanian et al. | 244/123 |
| 3,712,566 | 1/1973 | Branen et al. | 244/117 |
| 3,808,833 | 4/1974 | Allen et al. | 244/124 |
| 3,890,749 | 6/1975 | Gunther | 244/123 |
| 3,950,115 | 4/1976 | Euler | 244/123 |
| 4,006,999 | 2/1977 | Branfley et al. | 416/224 |
| 4,228,976 | 10/1980 | Eiselbrecher | 244/133 |

FOREIGN PATENT DOCUMENTS

| | | | |
|---|---|---|---|
| 523788 | 8/1921 | France | 416/224 |
| 550341 | 1/1943 | United Kingdom | 416/224 |
| 778685 | 7/1957 | United Kingdom | |
| 950434 | 2/1964 | United Kingdom | 416/224 |

Primary Examiner—Galen Barefoot
Attorney, Agent, or Firm—John Swiatocha

[57] ABSTRACT

A high strength, lightweight, heat resistant control surface for a high speed aircraft such as a missile or the like, comprises a heat resistant lightweight composite such as a graphite reinforced polyimide having a leading edge portion comprising a heat resistant metal such as Inconel. The leading edge portion includes a web fixing the leading edge portion to the composite by bonded attachment thereto at a location remote from the leading edge and adjacent surfaces thereby providing delayed exposure of the bond to leading edge heat buildup during flight.

10 Claims, 5 Drawing Figures

U.S. Patent  Sep. 15, 1987  4,693,435
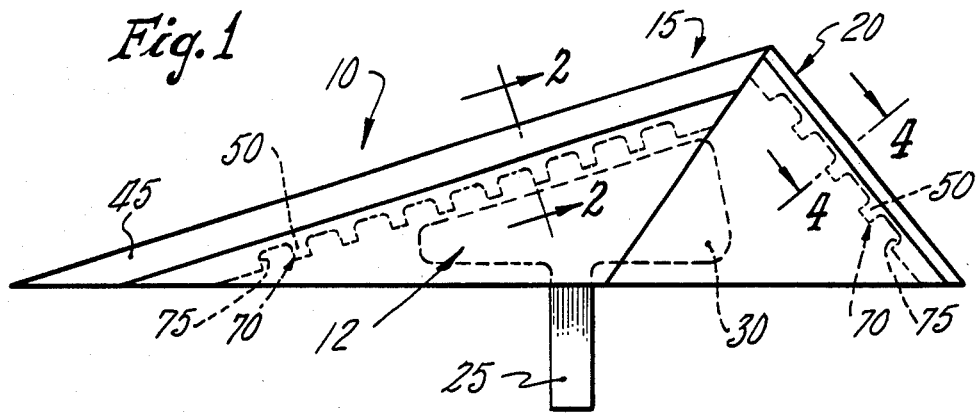
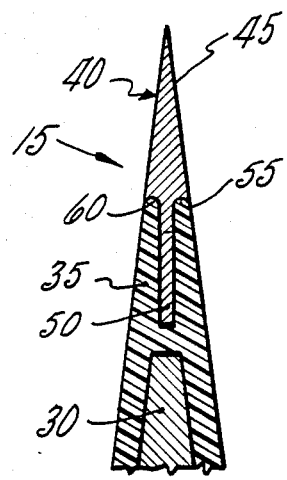 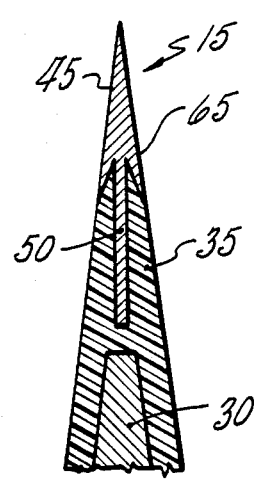 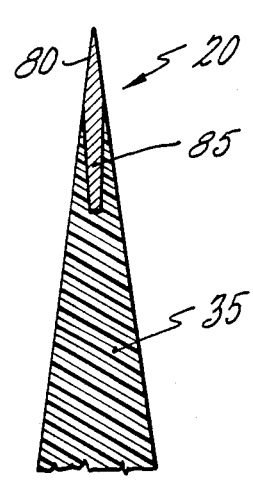
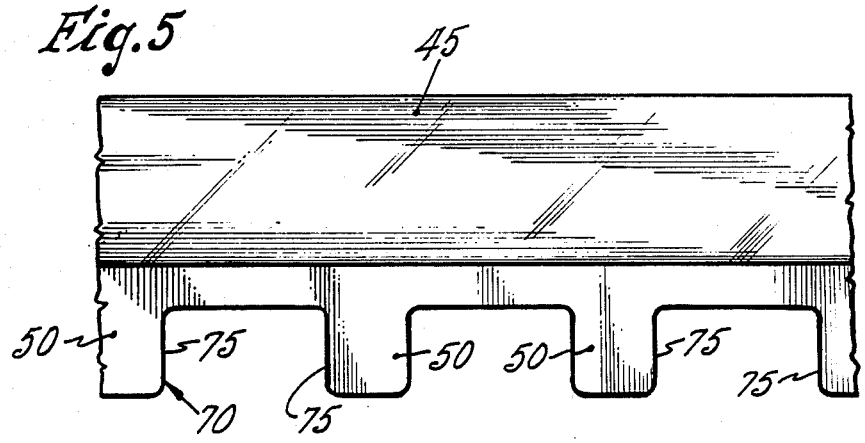

HIGH SPEED AIRCRAFT CONTROL SURFACE

This is a continuation of application Ser. No. 648,617, filed on Sept. 10, 1984, now abandoned; which is a continuation of Ser. No. 482,386, filed on Apr. 6, 1983, now abandoned; which is a continuation of application Ser. No. 219,754, filed on Dec. 23, 1980, now abandoned.

TECHNICAL FIELD

This invention relates to aerodynamic control surfaces such as fins, rudders, wings and the like for high speed aircraft such as guided missiles.

BACKGROUND ART

High speed aircraft such as guided missiles which travel at speeds as high as Mach 4 and above, may employ control surfaces such as fins, wings, rudders and the like to impart lift to the aircraft as well as to control the direction of flight thereof. Such control surfaces must have sufficient strength and durability to accommodate aerodynamic loading, impact by foreign objects encountered during flight and wear and tear from such normal handling as loading on, and unloading from another vehicle such as a fighter aircraft. Furthermore, it will be appreciated that the control surface, especially at the leading edge thereof, must be resistant to heating, due to friction as the control surface is propelled through the atmosphere.

Prior art high speed aircraft control surfaces have been mainly of two varieties. The first, includes metallic control surfaces having heat resistant leading edges of ceramic material. For weight minimization, the metallic portion of the control surface generally comprises a pair of opposed panels fixed to opposite sides of a framework, for example, of spars and stringers disposed between the panels. Accordingly, such control surfaces tend to be structurally complex. Moreover, the ceramic leading edges of such control surfaces are inherently quite brittle and not well equipped to stand up to handling as where the control surface is employed on a weapon such as a missile. Of course, impact with foreign objects during flight also presents a high risk of damage to such a ceramic leading edge. Examples of this first variety of high speed aircraft control surfaces are found in U.S. Pat. Nos. 3,028,128 to Freidrich; 3,114,524 to Conn, Jr. et al; and 3,430,898 to Parechanian et al.

A second variety of high speed aircraft control surfaces as taught by U.S. Pat. Nos. 3,145,000 to Mackie and 3,712,566 to Branen, employ heat resistant composite leading edges on metallic fins. As is the case with the first variety of prior art control surfaces discussed hereinabove, for weight minimization, the metallic portion of the fin in general, comprises the hereinabove described relatively complex framework supporting a pair of cover sheets or panels. Moreover, the composite leading edge, while being resistant to heat, is, like ceramic, not well adapted to withstand impact and therefore, could be subject to substantial degradation requiring repeated replacement over the life of the control surface as the control surface is maintained in readiness for a mission of the vehicle on which it is employed.

While it is known to provide a nose cone with a metallic tip portion as disclosed in U.S. Pat. No. 3,114,319 to Smith, the Smith configuration could fail to provide adequate isolation of the joint between the tip and the remainder of the nose cone from heating due to the impingement of air on the tip, resulting in possible failure of the tip-nose cone body joint and dislodging or detachment of the tip during flight.

DISCLOSURE OF INVENTION

It is therefore, a principal object of the present invention to provide a control surface for a high speed aircraft, such control surface being capable of withstanding high frictional heating without substantial ablation or other structural degradation.

It is another object of the present invention to provide such a control surface which is capable of withstanding impact loading due to normal handling and contact with foreign objects during flight.

It is another object of the present invention to provide such a control surface characterized by minimum weight and an economy of structure.

In accordance with the present invention, a high speed aircraft control surface comprises a main, body portion comprising a heat resistant, lightweight, high strength composite and a leading portion comprising a heat resistant metal. The leading portion includes a leading edge and a web extending inwardly (with respect to the body portion) therefrom and received within the interior of the composite for attaching the leading portion to the body portion. The web may be provided with a plurality of cutouts spaced therealong whereby composite on each side of the web may be integrally connected through the plane of the web for enhanced composite structural integrity. The web anchors the leading edge portion to the composite at a location remote from the leading edge, situating the web-composite bond joint at the interior of the body where heat buildup is delayed from that at the leading edge thereby rendering the control surface better able to withstand thermal transients resulting from operation of the vehicle on which the control surface is employed. The leading edge portion may include inwardly (with respect to the body portion) extending shoulder portions which define leading surfaces for enhanced resistance to impact loading during normal operation and handling. The trailing edge of the control surface may be provided with a metallic trailing portion comprising a metallic edge for impact resistance and a web portion for securing the trailing edge portion to the composite as well as for the conduction of heat thereto. The control surface is mounted on an aircraft by mounting means in surface-to-surface contact with a recess provided within the interior of the control surface. Opposed inner surfaces of the recess are convergent from the center thereof for transferring aerodynamic loading of the control surface to the mounting member in tension and compression as well as shear.

BRIEF DESCRIPTION OF THE DRAWINGS

FIG. 1 is a top plan view of the high speed aircraft control surface of the present invention.

FIG. 2 is an enlarged, fragmentary sectional view taken along line 2—2 of FIG. 1.

FIG. 3 is similar to FIG. 2, illustrating a modified form of the control surface leading edge portion.

FIG. 4 is an enlarged, fragmentary sectional view of the control surface of FIG. 1 and is taken along line 4—4 of FIG. 1.

FIG. 5 is an enlarged, fragmentary, top plan view of a web portion employed in the leading portion of the control surface of the present invention shown in FIG. 2.

BEST MODE FOR CARRYING OUT THE INVENTION

Referring to FIG. 1, the high speed aircraft control surface of the present invention is shown generally at 10 and is illustrated as a fin for an aircraft such as a guided missile or the like (not shown). The fin includes an inner, body portion 12 and outer leading and trailing portions 15 and 20 respectively, and is mounted on the aircraft by means of mounting arm 25 having an enlarged end portion 30 of tapered thickness, received within a mating recess within the interior of the control surface. While the control surface is shown as a fin for a missile or the like, it will be understood that the present invention is equally well applicable to wings, rudders, vertical stabilizers, or any other equivalent control surfaces used on high speed aircraft of any type, either manned or unmanned.

Referring to FIGS. 1–3, body portion 12 is formed from a high strength, heat resistant, lightweight composite 35 to which is fixed a heat resistant metal leading portion 40 exposed to leading edge heating during flight and which absorbs impact loading in handling and in flight, while minimizing such structural degradation as cracking, chipping or the like.

The composite may be any suitable lightweight heat resistant high strength composite such as graphite fiber reinforced polyimide. Other suitable reinforcement fibers include those formed from silicon carbide, boron, ceramics and the like. Other suitable matrix materials or binders include epoxies, or other heat resistant plastics, or such metals as titanium, aluminum or suitable alloys thereof. The composite may be formed in any convenient manner such as a layup in a suitable mold of parallel layers of reinforcing fibers coated with the matrix.

Leading portion 40 comprises a leading edge portion 45 and an inwardly extending web 50 integral with the leading edge portion. Leading portion 40, for effective mechanical coupling of the leading edge to the interior of the control surface and for the prevention of cracking, chipping and similar degradation of the leading edge of the control surface due to impact loading thereof from normal handling and operation of the control surface, is formed from a heat resistant metal of a greater ductility than composite 35 such as the chrome modified nickel alloy sold under the trademark Inconel ®. Other suitable materials for leading edge portion 40 include various alloys of titanium and/or steel such as AMS 4911 titanium or AMS 5604 stainless steel. In the preferred embodiment, this portion is adhesively bonded to body portion 12 by any suitable adhesive which may comprise the matrix material of composite 35 should it be desired to lay-up the body portion 12 about web 50. Referring to FIGS. 2 and 3, leading edge portion 45 may be provided with undercuts 55 which define shoulders 60 for added impact protection of the outer surfaces of the fin. These shoulders may extend only slightly inwardly relative to the center axis of the fin as shoulders 60 shown in FIG. 2 or may extend substantial distances inwardly such as shoulders 65 in FIG. 3 to maximize impact protection of the fin surfaces and reduce the risk of airflow separating the leading portion from the body portion.

It will be noted that in flight, substantial frictional heating of the leading edge occurs. Such heating may raise the temperature of the leading edge to a level beyond that which present bonded points are capable of withstanding. To locate the bonded joint interiorly of the fin where heating, and therefore, temperature rise is retarded, web 50 is provided, the leading portion-body portion joint being disposed along the web, surface portions of which extend relatively deep into the fin interior. The web also provides isolation of the bonding site from the mechanical effects of dissimilar thermal expansion stemming from a more rapid heating of leading edge portion 45 than composite 35. Referring to FIG. 5, the web may be provided with a plurality of spaced cutouts 70, each provided with transverse surfaces 75. Bonding of the composite to itself on either side of the web through the cutouts and to transverse surfaces 75 enhances the fixture of the web to the composite. Where it has been determined that adequate structural attachment of the leading portion to composite 35 may be achieved without cutouts 70, the cutouts may be dispensed with.

Referring to FIG. 4, trailing portion 20 of fin or control surface 10 may comprise a metallic trailing edge portion of such material as Inconel ®, titanium and alloys thereof or stainless steel, to prevent the hereinabove described edge degradation due to impact and normal handling wear and tear. In FIG. 4, this edge portion is shown at 80 and includes a web 85 integral therewith for connection of the leading edge to a bonding site in the interior of the composite 35 in the manner described hereinabove. Like web 50, web 85 may be provided with a plurality of spaced cutouts for the reasons described hereinabove with respect to web 50.

Referring again to FIGS. 2 and 3, enlarged end 30 of mounting member 25 is received within a mating recess in the fin and is disposed within that recess in surface-to-surface contact therewith. As set forth hereinabove, mounting member 25 structurally joins the fin with the aircraft in which it is employed and therefore, is heavily loaded from the aerodynamic loading of the fin. As shown, the mating surfaces of the enlarged end and recess are convergent from the center thereof whereby the interface between end 30 and the recess is loaded in compression as well as shear from the aerodynamic loading of the fin. Such compression loading is better accommodated by the joint between end 30 and the fin than would be similar loading in pure shear.

It will be appreciated therefore that the control surface of the present invention while being light in weight due to the utilization of a composite as a main structural component thereof, exhibits substantial resistance to edge degradation due to impact loading from handling and normal operation. Thermal degradation of the bond between the body and leading portions is avoided by means of the web portions which firmly anchors the metallic edges to the composite.

Although this invention has been shown and described with respect to detailed embodiments thereof, it will be understood that various modifications in form and detail will suggest themselves to those skilled in the art, and it is intended by the appended claims to cover such modifications as come within the true spirit and scope of this invention.

We claim:

1. A high speed aircraft control surface characterized by said control surface including a body portion formed from a heat resistant, lightweight, high strength composite and including a leading portion formed from a heat resistant metal, said leading portion comprising a leading edge portion and a mounting web disposed along substantially the entire leading edge portion, and extending inwardly along said entire leading edge portion a distance of from approximately 25% to 100% of the width of said control surface measured in a direction normal to said leading edge portion, said web being received within and attached to the interior of said composite, fixing said leading portion to said body portion at a location remove from said leading edge portion.

2. The high speed control surface of claim 1 wherein said web at a free edge thereof is provided with a plurality of spaced cutouts, providing transverse bonding of said composite material to itself through said web.

3. The high speed control surface of claim 1 wherein said leading edge portion at the junction thereof with said web includes undercut portions defining a pair of inwardly extending shoulders defining outer surfaces of said leading edge portion.

4. The high speed control surface of claim 1 wherein said composite comprises a matrix having a plurality of reinforcing filaments disposed therewithin, said matrix comprising at least one material from the group including: aluminum, titanium polyimide and epoxy resin.

5. The high speed control surface of claim 4 wherein said reinforcing filaments are formed from at least one material from the group comprising: graphite, boron, silicon carbide and ceramic.

6. The high speed aircraft control surface of claim 1 wherein said metal comprises at least one metal selected from the group comprising: nickel alloy, steel and titanium.

7. The high speed control surface of claim 1 wherein said control surface is attached to said aircraft by a mounting member received within a recess in said control surface, and disposed in surface-to-surface contact with said recess, at least portions of opposed inner surfaces of said recess being convergent from the center of said recess.

8. The high speed aircraft control surface of claim 1 and further including a trailing portion formed from a heat resistant metal, said trailing portion comprising a trailing edge portion and a mounting web extending inwardly therefrom and received within the interior of said composite, fixing said trailing portion to said control surface at a location remote from said trailing edge portion.

9. The high speed aircraft control surface of claim 8 wherein said trailing portion is formed from at least one metal selected from the group comprising: nickel alloy, steel and titanium.

10. The high speed aircraft control of claim 1 wherein said web includes a plurality of cutouts for enhancing the fixture of said web to said body portion.

* * * * *